Patented Aug. 14, 1951

2,564,561

UNITED STATES PATENT OFFICE 2,564,561

GREASE COMPOSITION

Emmett S. Carmichael and Eldon L. Armstrong, Jackson Heights, N. Y., assignors to Socony-Vacuum Oil Company, Incorporated, a corporation of New York No Drawing. Application May 20, 1944, Serial No. 536,604

10 Claims. (Cl. 252—40.5)

This invention is directed to improvements in barium base greases, that is, to grease compositions consisting basically of mineral oils in admixture with barium soaps of fatty acids or with a sufficient proportion of such barium soaps present to give to the greases the characteristics usually recognized as attributable to barium base greases. Such barium base greases are, in general, excellent greases and may be used successfully for a number of applications, such as for example, for chassis, water pumps, motor bearing and wheel bearing applications under both high and low temperature conditions and at high or low rates of shear.

These greases, however, like many other greases, are not too stable in their ordinary form at temperatures near or above the normal boiling point of water.

This invention has for its object the provision of novel and improved barium base greases characterized by high stabilities at temperatures well above those temperatures at which the normal types of barium base greases become highly unstable.

Various tests exist for measuring the stability of greases under high temperature conditions. Those most generally used are the tests known as "A. S. T. M. dropping point test D566-42" and the "B. E. C. test."

The first test is a method of test for dropping point of lubricating greases, described on pages 113-115, of the September, 1943 issue of the "A. S. T. M. Standards of Petroleum Products and Lubricants, Prepared by Committee D-2." This dropping point test consists essentially of placing the grease within a grease cup which has an open orifice of specified diameter at the bottom and is surrounded by a heating jacket. Upon raising the temperature gradually, the temperature is observed at which the first drop of grease passes through the orifice.

This test gives information as to when the grease is softened, by heating, to a point of leakage and dropping through an orifice of specified diameter. Although the test is made on a grease sample in a perfectly quiescent state and, therefore, may not represent the actual service conditions, it gives valuable indication as to the consistency which may be expected in grease feeding devices at elevated temperatures and which, in turn, has a bearing on the consumption of the grease.

The second test is conducted in the so-called B. E. C. grease testing machine, developed by the Bearing Engineers' Committee of the Antifriction Bearing Manufacturers Association. This machine has been developed to study the structural stability of greases when agitated in a working ball bearing under specified conditions at known temperatures. Essentially, it is a ball bearing assembly operated at 3450 R. P. M. by a vertical motor and suspended in an oil bath, the temperature of which can be conveniently maintained at any level up to 300° F. The inner race of the bearing is mounted on the extension spindle of the motor, and the outer race can be rigidly set in a grease cup. This cup is free to turn with the bearing to allow torque measurements. A known amount of grease is packed into the bearing and around the shaft. The bearing is shielded by a plate on the bottom side with a small circular clearance between the shield and the outer race. Any leakage of oil or molten grease through this clearance is collected on the bottom of the grease cup and can be quantitatively determined. The initial test is conducted at 80–85° F., and subsequent tests are made at 150° F., 180° F. and 220° F. as required, the duration of each being 20 minutes. During all of these tests, separation of oil, change of structure, channelling, and aeration are noted, in addition to the torque readings. The B. E. C. tester is valuable for predicting the suitability of greases for ball bearing lubrication at elevated temperatures.

This invention has for its principal object the provision of barium base greases of improved stability, as measured by these two methods of test and is based upon the discovery that a very considerably enhanced stability may be conferred upon such greases by the incorporation therein of a salt of an aliphatic acid of low molecular weight. To describe both the conventional barium base greases and certain modifications made therein within the scope of this invention, the following formulae are presented:

TABLE I

| | Grease No. 1 | Grease No. 2 | Grease No. 3 |
|---|---|---|---|
| Stearic Acid, Per Cent | 18.0 | 14.0 | 14.0 |
| Candelilla Wax, Per Cent | | 4.0 | 4.0 |
| Glacial Acetic Acid, Per Cent | | | 4.0 |
| Glycerine, Per Cent | 1.0 | 2.5 | 6.5 |
| Barium Hydroxide, $Ba(OH)_2 \cdot 8H_2O$, Per Cent | 11.2 | 9.0 | 19.0 |
| Solar Red Oil, Per Cent | 69.8 | 70.5 | 52.5 |

Of the above greases, grease No. 1 is a conventional barium base grease formulated of stearic acid, glycerine, barium hydroxide and oil and constitutes a mixture of oil, barium stearate soap, and a small amount of glycerine. Grease No. 2 is essentially the same composition with a slight increase in the amount of glycerine present but with the major difference being that candelilla wax has been added. This wax affects certain changes in the texture and consistency of the grease and such wax additions may be made in various amounts for this purpose. Grease No. 3 is a grease embodying the teaching of this disclosure in that its formula also contains glacial acetic acid and sufficient barium hydroxide to neutralize that acid, giving rise to an admixture of oil, barium stearate soap, barium acetate, glycerine and candelilla wax. The above greases may be prepared in accordance with any of the usual compounding procedures such as those described by Klemgard on page 682 of "Lubricating Greases: Their Manufacture and Use," Reinhold Publishing Corp. (1937).

When samples of these three greases were subjected to the A. S. T. M. dropping point test in the manner described above, the following results were observed:

TABLE II

|  | Grease No. 1 | Grease No. 2 | Grease No. 3 |
| --- | --- | --- | --- |
| A. S. T. M. Dropping Point, °F | 240 | 235 | 343 |

From the above it will be observed that the conventional grease indicated a substantial loss of stability, as indicated by the dropping point test, at 240° F., while grease No. 2 containing candelilla wax was of practically the same stability. However, grease No. 3 exhibits a dropping point 100° higher than does the conventional grease, thus indicating a major and significant increase in temperature stability.

Similar results were found when the three greases were submitted to the B. E. C. test, in which the following results were found:

TABLE III

B. E. C. tests

| Grease No. 1 | | | Grease No. 2 | | | Grease No. 3 | | |
| --- | --- | --- | --- | --- | --- | --- | --- | --- |
| Temp., °F. | Time of Test | Total Leakage | Temp., °F. | Time of Test | Total Leakage | Temp., °F. | Time of Test | Total Leakage |
| | Min. | | | Min. | | | Min. | |
| 80 | 20 | None | 80 | 20 | None | 80 | 20 | None. |
| 150 | 20 | Trace | 150 | 20 | Trace | 150 | 20 | Trace. |
| 180 | 20 | 5% | 180 | 20 | 10% | 180 | 20 | Do. |
| 220 | 20 | Full Cup [1] | 220 | 20 | Full Cup [1] | 220 | 20 | 5%. |

[1] Corresponds to approximately 30% of total quantity of grease used.

This test it will be observed, confirms by parallel results the finding of the A. S. T. M. test in that at 220° F. both the conventional grease No. 1 and grease No. 2, which is the conventional grease plus a wax had both leaked sufficiently to give a full cup, while at the same temperature only 5% of grease No. 3 had leaked into the cup.

These results indicate a very substantial and useful increase in the temperature stability of barium base greases and very considerably widen the field to which they may be applied, rendering them capable of use in a great number of applications at temperatures above the boiling point of water wherein they have formerly not been capable of use with a particularly good degree of efficiency.

It is also apparent that the wax ingredient does not confer heat stability. However, other improvements in other characteristics do follow from the use of wax such that the grease containing both barium acetate and wax is a better grease from many standpoints than the grease containing only the barium acetate.

With respect to this wax candelilla or montan wax or other similar waxes may be used. In general, such wax should not be used in excess of 10% of the total ingredient, the preferred amount being from about 1% to about 5%.

With respect to the barium acetate, while that salt is one which it is preferred to use to secure this desired temperature stability, there may be used in its place any of the salts of the lower molecular weight mono-basic aliphatic acids, the upper limit of molecular weight being defined by a mono-basic fatty acid not having over six carbon atoms. This barium acetate or its equivalent will normally be used in amounts of not over about 10% of the final composition, the minimum amount to be used being about 0.5% and the preferred amount being from 1% to 7%.

Also in such greases the barium soap of the fatty acid will, in general, be not more than about 30% of the final composition, the preferred range being from 5% to 20% of such constituent.

We claim:

1. Improved barium base greases characterized by stability at temperatures in excess of 200° F. formed by compounding together from 5 to 20% of high molecular weight fatty acid soap forming materials, from 0.5 to 5% of monobasic fatty acids of not over 6 carbon atoms, from 1 to 10% of a wax selected from the group consisting of candelilla and montan wax and sufficient barium hydroxide to react with the above acidic constituents, the remainder being lubricating oil.

2. An improved barium grease composition characterized by stability at temperatures in excess of 200° F. produced by compounding together—

| | Per cent |
| --- | --- |
| Stearic acid | 14.0 |
| Candelilla wax | 4.0 |
| Glacial acetic acid | 4.0 |
| Glycerine | 6.5 |
| Barium hydroxide, Ba(OH)$_2$.8H$_2$O | 19.0 |
| Lubricating oil | 52.5 |

3. An improved barium base grease composition characterized by stability at temperatures in excess of 200° F., comprising lubricating oil and a sufficient proportion of the barium soaps of fatty acids to characterize the grease as one having a barium base and, in addition thereto, a small proportion sufficient to stabilize the grease of the barium salt of a mono basic fatty acid having not more than 6 carbon atoms.

4. An improved barium base grease composition characterized by stability at temperatures in excess of 200° F., comprising lubricating oil and a sufficient proportion of the barium soaps of fatty acids to characterize the grease as one having a barium base and, in addition thereto, a small proportion sufficient to stabilize the grease of barium acetate.

5. An improved barium base grease composition characterized by stability at temperatures in excess of 200° F., comprising lubricating oil, a sufficient proportion of the barium soaps of fatty acids to characterize the grease as one having a barium base, and a small proportion sufficient to stabilize the grease of barium salts of mono basic fatty acids having not more than 6 carbon atoms and, in addition thereto, a small proportion of a wax selected from the group consisting of montan and candelilla waxes.

6. An improved barium base grease composition characterized by stability at temperatures in excess of 200° F., comprising lubricating oil and a sufficient proportion of the barium soaps of high molecular weight fatty acids to characterize the grease as one having a barium base and a small proportion sufficient to stabilize the grease but not over about 10 per cent of the barium salt of a mono basic fatty acid having not more than 6 carbon atoms.

7. An improved barium base grease composition characterized by stability at temperatures in excess of 200° F., comprising lubricating oil and a sufficient proportion of the barium soaps of high molecular weight fatty acids to characterize the grease as one having a barium base and a small proportion sufficient to stabilize the grease but not over about 10 per cent of the barium salt of acetic acid.

8. An improved barium grease composition characterized by stability at temperatures in excess of 200° F., comprising lubricating oil and a sufficient proportion of the barium soaps of high molecular weight fatty acids to characterize the grease as one having a barium base to which have been added a small proportion sufficient to stabilize the grease but not over about 10 per cent barium acetate and not over about 10 per cent of a wax selected from the group consisting of montan and candelilla waxes.

9. An improved barium base grease composition characterized by stability at temperatures in excess of 200° F., comprising mineral oil, between about 5 and about 30 per cent by weight of the barium soaps of fatty acids, and between about 0.5 and about 10 per cent by weight of the barium salt of a mono basic fatty acid having not more than 6 carbon atoms.

10. An improved barium base grease composition characterized by stability at temperatures in excess of 200° F., comprising mineral oil, between about 5 and about 30 per cent by weight of the barium soaps of fatty acids, and between about 0.5 and about 10 per cent by weight of barium acetate.

EMMETT S. CARMICHAEL.
ELDON L. ARMSTRONG.

REFERENCES CITED

The following references are of record in the file of this patent:

UNITED STATES PATENTS

| Number | Name | Date |
| --- | --- | --- |
| 2,033,148 | Ott et al. | Mar. 10, 1936 |
| 2,070,781 | Brunstrum et al. | Feb. 16, 1937 |
| 2,154,383 | Ott et al. | Apr. 11, 1939 |
| 2,197,263 | Carmichael et al. | Apr. 16, 1940 |
| 2,332,247 | Morway et al. | Oct. 19, 1943 |
| 2,332,825 | Zimmer et al. | Oct. 26, 1943 |
| 2,355,099 | Morway et al. | Aug. 1, 1944 |
| 2,417,428 | McLennan | Mar. 18, 1947 |
| 2,417,433 | McLennan | Mar. 18, 1947 |

OTHER REFERENCES

McLennan, Methods of Compounding Barium Greases, Article in National Petroleum News, Apr. 5, 1944, pp. R234, R236, R238, R239.